(12) United States Patent
Rodriguez et al.

(10) Patent No.: US 8,848,780 B2
(45) Date of Patent: Sep. 30, 2014

(54) VIDEO PROCESSING IMPERMEABLE TO ADDITIONAL VIDEO STREAMS OF A PROGRAM

(75) Inventors: Arturo A. Rodriguez, Norcross, GA (US); Benjamin Cook, Flowery Branch, GA (US); Jeffrey C. Hopper, Decatur, GA (US)

(73) Assignee: Cisco Technology, Inc., San Jose, CA (US)

( * ) Notice: Subject to any disclaimer, the term of this patent is extended or adjusted under 35 U.S.C. 154(b) by 1260 days.

(21) Appl. No.: 12/342,875

(22) Filed: Dec. 23, 2008

(65) Prior Publication Data

US 2009/0141794 A1  Jun. 4, 2009

Related U.S. Application Data

(62) Division of application No. 11/132,060, filed on May 18, 2005.

(51) Int. Cl.
*H04N 7/12* (2006.01)
*H04N 7/173* (2011.01)
*H04N 21/2662* (2011.01)
*H04N 21/4402* (2011.01)
*H04N 21/258* (2011.01)
*H04N 21/2343* (2011.01)
*H04N 21/235* (2011.01)
*H04N 21/435* (2011.01)
*H04N 7/01* (2006.01)

(52) U.S. Cl.
CPC ... *H04N 21/440218* (2013.01); *H04N 21/2662* (2013.01); *H04N 21/4402* (2013.01); *H04N 21/440263* (2013.01); *H04N 21/25808* (2013.01); *H04N 21/234363* (2013.01); *H04N 21/235* (2013.01); *H04N 21/435* (2013.01); *H04N 21/234309* (2013.01); *H04N 7/012* (2013.01)
USPC ...................................... 375/240.01; 725/114

(58) Field of Classification Search
USPC ............................... 370/240.26, 469; 386/95
See application file for complete search history.

(56) References Cited

U.S. PATENT DOCUMENTS

| 5,444,491 | A | 8/1995 | Lim | 348/441 |
| 5,508,746 | A | 4/1996 | Lim | 348/429 |
| 5,742,343 | A | 4/1998 | Haskell et al. | 348/415 |
| 5,923,820 | A | 7/1999 | Cunnagin et al. | |

(Continued)

FOREIGN PATENT DOCUMENTS

| WO | WO 91/07847 | 5/1991 |
| WO | WO 01/76245 | 10/2001 |

(Continued)

OTHER PUBLICATIONS

U.S. Official Action mailed Oct. 27, 2009 in U.S. Appl. No. 11/132,060.
U.S. Official Action mailed Nov. 13, 2009 in U.S. Appl. No. 12/342,938.
Schwarz et al., "Overview of the Scalable Video Coding Extension of the H.264/AVC Standard," IEEE Transactions on Circuits and Systems for Video Technology, IEEE Service Center, Piscataway,NJ, US, vol. 17, 9, Sep. 2007, pp. 1103-1120, XP011193019.

(Continued)

*Primary Examiner* — Benjamin R Bruckart
*Assistant Examiner* — Anthony Bantamoi
(74) *Attorney, Agent, or Firm* — Merchant & Gould

(57) ABSTRACT

Methods and systems for the efficient and non-redundant transmission of a single video program in multiple frame rates, optionally employing a combination of video coding standards, in a way that is backwards-compatible with legacy receivers only supportive of some subsection of frame rates or of some subsection of video coding standards.

20 Claims, 4 Drawing Sheets

(56) References Cited

U.S. PATENT DOCUMENTS

| | | | |
|---|---|---|---|
| 6,208,382 B1 | 3/2001 | Glenn | 348/448 |
| 6,337,716 B1 | 1/2002 | Yim | 348/554 |
| 6,353,613 B1 | 3/2002 | Kubota et al. | |
| 6,377,309 B1* | 4/2002 | Ito et al. | 348/554 |
| 6,757,911 B1 | 6/2004 | Shimoji et al. | |
| 6,801,575 B1 | 10/2004 | Crinon | 375/240.26 |
| 7,020,205 B1* | 3/2006 | Beyers et al. | 375/240.26 |
| 7,366,462 B2 | 4/2008 | Murali et al. | |
| 2001/0006404 A1 | 7/2001 | Yun | |
| 2002/0054638 A1 | 5/2002 | Hanamura et al. | |
| 2002/0075954 A1 | 6/2002 | Vince | 375/240.01 |
| 2002/0162114 A1* | 10/2002 | Bisher et al. | 725/91 |
| 2004/0240860 A1 | 12/2004 | Bruls et al. | |
| 2004/0244059 A1 | 12/2004 | Coman | 725/139 |
| 2004/0264931 A1* | 12/2004 | Nakashika et al. | 386/95 |
| 2005/0015794 A1 | 1/2005 | Roelens | |
| 2005/0210523 A1 | 9/2005 | Parnell et al. | 725/97 |
| 2006/0023748 A1* | 2/2006 | Chandhok et al. | 370/469 |
| 2006/0146734 A1 | 7/2006 | Wenger et al. | |
| 2006/0271990 A1 | 11/2006 | Rodriguez et al. | 725/118 |
| 2009/0067507 A1 | 3/2009 | Baird et al. | 375/240.24 |
| 2009/0103605 A1 | 4/2009 | Rodriguez et al. | 375/240.01 |
| 2009/0103634 A1 | 4/2009 | Rodriguez et al. | 375/340.26 |
| 2009/0106812 A1 | 4/2009 | Rodriguez et al. | 725/131 |
| 2009/0106814 A1 | 4/2009 | Rodriguez et al. | 725/151 |
| 2009/0122183 A1 | 5/2009 | Rodriguez et al. | 348/446 |
| 2009/0122184 A1 | 5/2009 | Rodriguez et al. | 348/446 |
| 2009/0122185 A1 | 5/2009 | Rodriguez et al. | 348/446 |
| 2009/0122186 A1 | 5/2009 | Rodriguez et al. | 348/446 |
| 2009/0122190 A1 | 5/2009 | Rodriguez et al. | 348/500 |
| 2009/0122858 A1 | 5/2009 | Rodriguez et al. | 375/240.01 |
| 2009/0144796 A1 | 6/2009 | Rodriguez et al. | 725/118 |
| 2009/0154553 A1 | 6/2009 | Rodriguez et al. | 375/240.01 |

FOREIGN PATENT DOCUMENTS

| | | | | |
|---|---|---|---|---|
| WO | WO 03/026300 A | 3/2003 | | |
| WO | WO 2006/125052 A1 | 11/2006 | | H04N 7/24 |
| WO | WO 2007/076486 A | 7/2007 | | |

OTHER PUBLICATIONS

Wiegand et al., "Overview of the H.264/AVC Video Coding Standard," IEEE Transactions on Circuits and Systems for Video Technology, vol. 13, 7, Jul. 2003, pp. 560-576, XP002509016.
European Examination dated Jan. 21, 2011 in Application No. 08 830 482.9, 3 pages.
U.S. Final Official Action mailed Mar. 21, 2011 in U.S. Appl. No. 12/342,576.
U.S. Final Official Action mailed Mar. 24, 2011 in U.S. Appl. No. 12/342,938.
U.S. Non-Final Official Action mailed Apr. 1, 2011 in U.S. Appl. No. 12/342,572.
U.S. Final Official Action mailed Apr. 1, 2011 in U.S. Appl. No. 12/342,824.
U.S. Final Official Action mailed Apr. 6, 2011 in U.S. Appl. No. 12/342,567.
U.S. Final Official Action mailed Apr. 13, 2011 in U.S. Appl. No. 12/342,582.
U.S. Non-Final Official Action mailed May 3, 2011 in U.S. Appl. No. 12/342,914.
U.S. Non-Final Official Action mailed May 12, 2011 in U.S. Appl. No. 12/342,934.
U.S. Official Action mailed May 10, 2010 in U.S. Appl. No. 11/132,060.
U.S. Final Official Action mailed Apr. 13, 2010 in U.S. Appl. No. 12/342,934.
U.S. Final Office Action mailed Apr. 9, 2010 in U.S. Appl. No. 12/342,914.
U.S. Final Official Action mailed May 11, 2010 in U.S. Appl. No. 12/342,938.

European Patent Application, 0 608 092 A2, Dated Jul. 1994.
European Patent Application, EP 1 182 877 A2, Dated Feb. 2002.
U.S. Appl. No. 12/342,567, filed Dec. 23, 2008, entitled "Providing Video Programs with Identifiable and Manageable Video Streams".
U.S. Appl. No. 12/342,569, filed Dec. 23, 2008, entitled "Receiving and Processing Multiple Streams Associated with a Video Program".
U.S. Appl. No. 12/342,572, filed Dec. 23, 2008, entitled "Providing Complementary Streams of a Program Coded According to Different Compression Methods".
U.S. Appl. No. 12/342,576, filed Dec. 23, 2008, entitled "Providing Identifiable Video Streams of Different Picture Formats".
U.S. Appl. No. 12/342,582, filed Dec. 23, 2008, entitled "Providing Video Streams of a Program with Different Stream Type Values Coded According to the Same Video Coding Specification".
U.S. Appl. No. 12/342,824, filed Dec. 23, 2008, entitled "Adaptive Processing of Programs with Multiple Video Streams".
U.S. Appl. No. 12/342,914, filed Dec. 23, 2008, entitled "Processing Different Complementary Streams of a Program".
U.S. Appl. No. 12/342,934, filed Dec. 23, 2008, entitled "Processing Video Streams of a Different Picture Formats".
U.S. Appl. No. 12/342,938, filed Dec. 23, 2008, entitled "ERA-Dependent Receiving and Processing of Programs with One or More Video Streams".
U.S. Appl. No. 12/342,946, filed Dec. 23, 2008, entitled "Processing Identifiable Video Streams of a Program According to Stream Type Values".
U.S. Appl. No. 12/343,032, filed Dec. 23, 2008, entitled "Providing a Video Stream with Alternate Packet Identifiers".
U.S. Appl. No. 12/343,059, filed Dec. 23, 2008, entitled "Receiving and Separating an Encoded Video Stream into Plural Encoded Pictures with Different Identifiers".
U.S. Appl. No. 11/132,060, filed May 18, 2005, entitled "Higher Picture Rate HD Encoding and Transmission with Legacy HD Backward Compatibility".
U.S. Official Action mailed Jun. 2, 2008 in U.S. Appl. No. 11/132,060.
U.S. Official Action mailed Mar. 20, 2009 in U.S. Appl. No. 11/132,060.
Bayrakeri S et al., "MPEG-2/ECVQ Lookahead Hybrid Quantization and Spatially Scalable Coding" The Spie, Bellingham WA., vol. 3024, pp. 129-137.
U.S. Official Action mailed Sep. 30, 2009 in U.S. Appl. No. 12/342,934.
U.S. Official Action mailed Sep. 30, 2009 in U.S. Appl. No. 12/342,914.
PCT Search Report mailed Oct. 24, 2006 in PCT/US2006/019181.
PCT Written Opinion mailed Oct. 24, 2006 in PCT/US2006/019181.
U.S. Non-Final Official Action mailed Oct. 14, 2010 in U.S. Appl. No. 12/342,567.
U.S. Non-Final Official Action mailed Oct. 1, 2010 in U.S. Appl. No. 12/342,572.
U.S. Non-Final Official Action mailed Oct. 6, 2010 in U.S. Appl. No. 12/342,576.
U.S. Non-Final Official Action mailed Sep. 28, 2010 in U.S. Appl. No. 12/342,582.
U.S. Non-Final Official Action mailed Oct. 15, 2010 in U.S. Appl. No. 12/342,824.
U.S. Official Action mailed Sep. 16, 2010 in U.S. Appl. No. 12/342,914.
U.S. Non-Final Official Action mailed Sep. 28, 2010 in U.S. Appl. No. 12/342,934.
U.S. Official Action mailed Oct. 8, 2010 in U.S. Appl. No. 12/342,938.
U.S. Non-Final Official Action mailed Nov. 8, 2010 in U.S. Appl. No. 11/132,060.
U.S. Final Office Action mailed Jan. 13, 2014 in U.S. Appl. No. 12/342,824, 18 pages.
U.S. Office Action mailed Mar. 28, 2014 in U.S. Appl. No. 13/909,633, 10 pages.

* cited by examiner

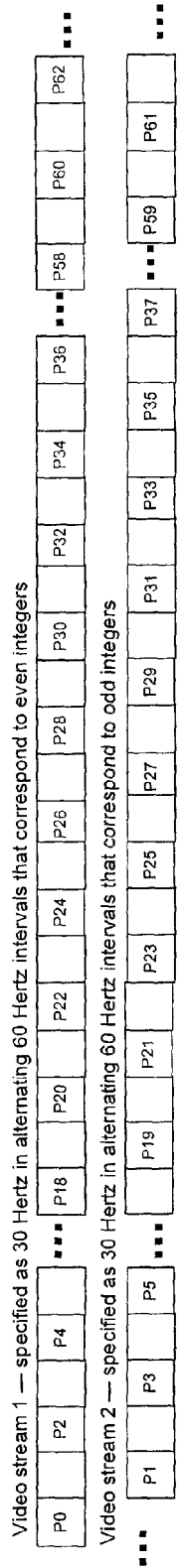
FIG. 4A -- 1080P-60 in Display Order
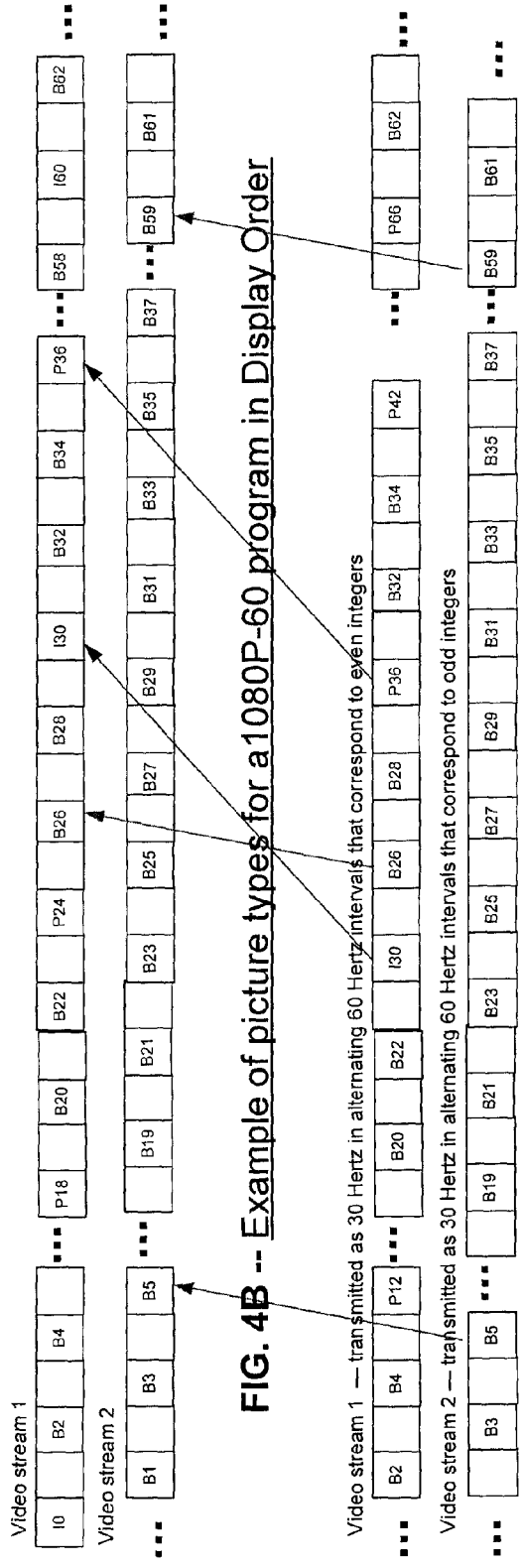
FIG. 4B -- Example of picture types for a 1080P-60 program in Display Order
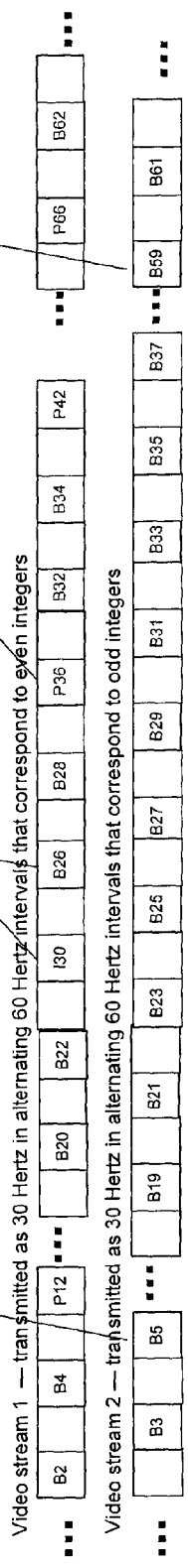
FIG. 4C -- Example of picture types for a 1080P-60 program in Transmission Order

VIDEO PROCESSING IMPERMEABLE TO ADDITIONAL VIDEO STREAMS OF A PROGRAM

CROSS-REFERENCE TO RELATED APPLICATION

This application is a divisional of copending U.S. utility application entitled, "Higher Picture Rate HD Encoding and Transmission with Legacy HD Backward Compatibility," having Ser. No. 11/132,060, filed May 18, 2005, which is entirely incorporated herein by reference.

TECHNICAL FIELD

The present invention relates to digital television and, more specifically to receivers with different capabilities for receiving, processing and displaying the same emission of a compressed video signal, each receiver providing one in a plurality of picture formats according to its respective capability.

BACKGROUND OF THE INVENTION

There are many different digital television compressed video picture formats, some of which are HD. HDTV currently has the highest digital television spatial resolution available. The picture formats currently used in HDTV are 1280×720 pixels progressive, 1920×1080 pixels interlaced, and 1920×1080 pixels progressive. These picture formats are more commonly referred to as 720P, 1080i and 1080P, respectively. The 1080i format, which comprises of interlaced pictures, each picture or frame being two fields, shows 30 frames per second and it is deemed as the MPEG-2 video format requiring the most severe consumption of processing resources. The 1080P format shows 60 frames per second, each frame being a progressive picture, and results in a doubling of the most severe consumption of processing resources. A receiver capable of processing a maximum of 1080i-60 is also capable of processing a maximum 1080P-30. However, broadcasters intend to introduce 1080P-60 emissions and CE manufacturers intend to provide HDTVs and HDTV monitors capable of rendering 1080P-60, in the near future. 1080P-60 includes twice as much picture data as either 1080i-60 or 1080P-30. Dual carrying channels or programs as 1080P-60 and 1080i-60 would not be an acceptable solution because it triples the channel consumption of a single 1080i-60 transmission.

Therefore, there is a need for encoding 1080P-60 video for transmission in a way that facilitates the superior picture quality benefits of a 1080P-60 signal to 1080P-60 capable receivers while simultaneously enabling legacy 1080i-60 capable receivers to fulfill the equivalent of a 1080P-30 signal from the transmitted 1080P-60 signal.

BRIEF DESCRIPTION OF THE DRAWINGS

FIG. 4A illustrates first and second video streams in display order.

FIG. 4B illustrates pictures according to picture types in display order.

FIG. 4C illustrates transmission order of the pictures in display order of FIG. 2B.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

It is noted that "picture" is used throughout this specification as one from a sequence of pictures that constitutes video, or digital video, in one of any of a plurality of forms. Furthermore, in this specification a "frame" means a picture, either as a full progressive picture or in reference to a whole instance of a full frame comprising both fields of an interlaced picture.

Video Decoder in Receiver

Figure 1:
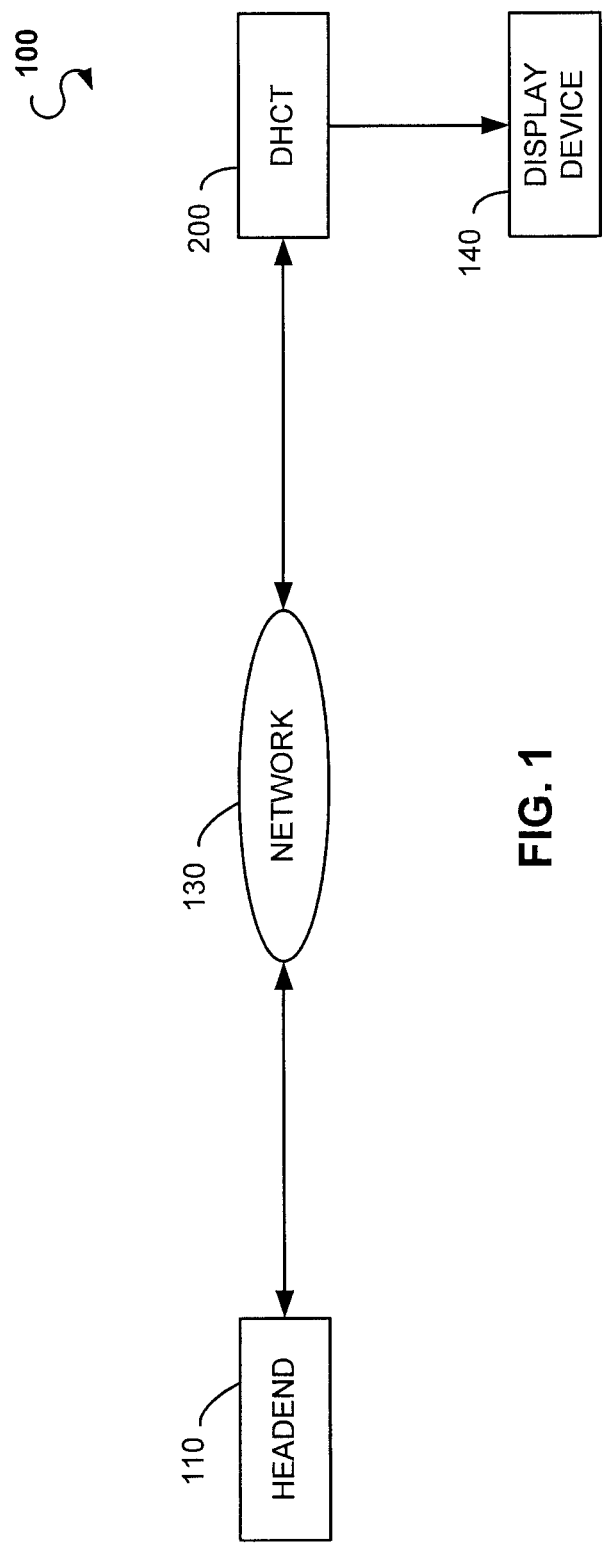
FIG. 1 is a high-level block diagram depicting a non-limiting example of a subscriber television system.

FIG. 1 is a block diagram depicting a non-limiting example of a subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, the display device 140 or a personal computer (not shown). The DHCT 200 receives signals (video, audio and/or other data) including, for example, MPEG-2 streams, among others, from the headend 110 through the network 130 and provides any reverse information to the headend 110 through the network 130. The network 130 may be any suitable means for communicating television services data including, for example, a cable television network or a satellite television network, among others. The headend 110 may include one or more server devices (not shown) for providing video, audio, and textual data to client devices such as DHCT 200. Television services are provided via the display device 140 which is typically a television set. However, the display device 140 may also be any other device capable of displaying video images including, for example, a computer monitor.

Figure 2:
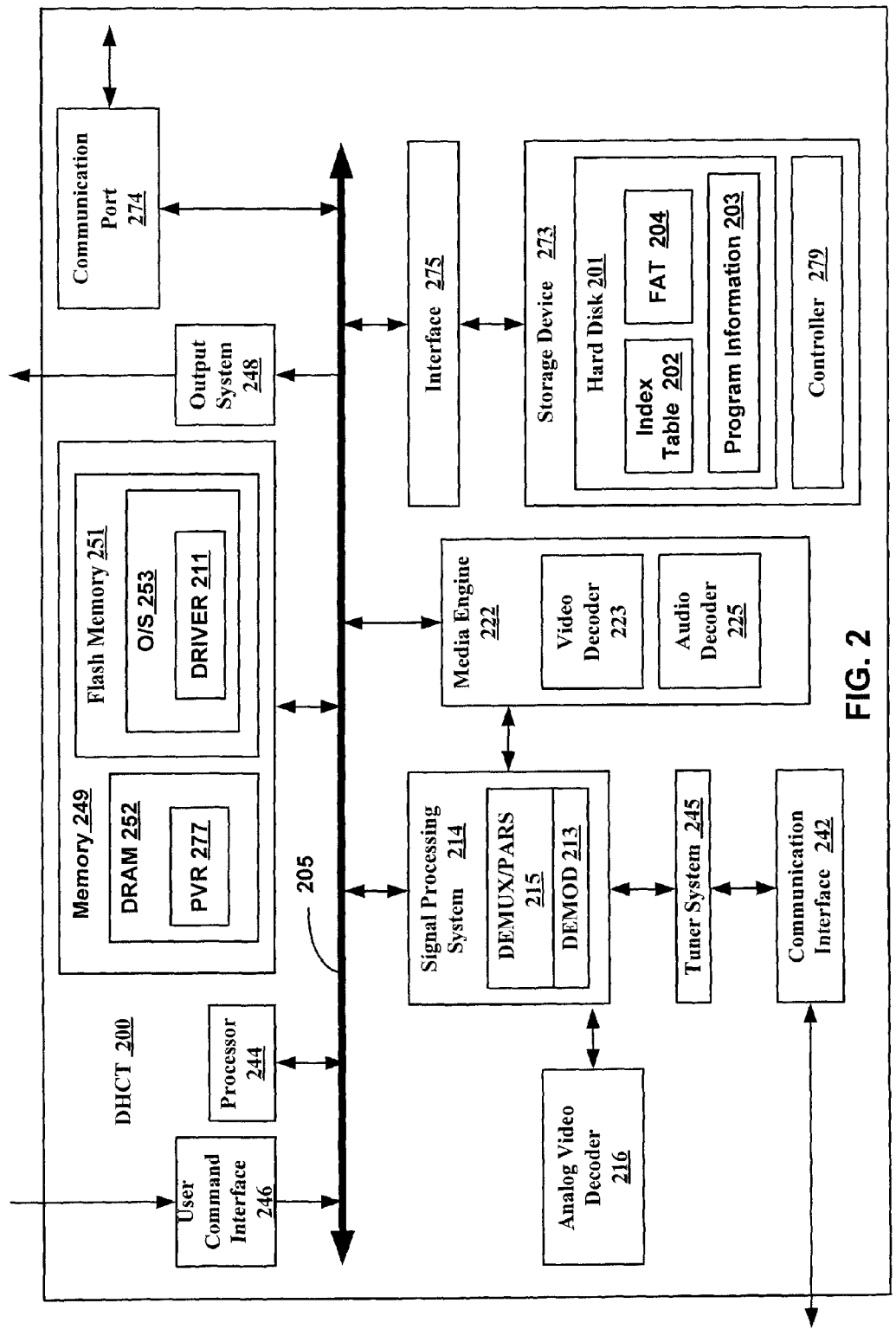
FIG. 2 is a block diagram of a DHCT in accordance with one embodiment of the present invention.

FIG. 2 is a block diagram illustrating selected components of a DHCT 200 in accordance with one embodiment of the present invention. It will be understood that the DHCT 200 shown in FIG. 2 is merely illustrative and should not be construed as implying any limitations upon the scope of the preferred embodiments of the invention. For example, in another embodiment, the DHCT 200 may have fewer, additional, and/or different components than illustrated in FIG. 2. A DHCT 200 is typically situated at a user's residence or place of business and may be a stand alone unit or integrated into another device such as, for example, a television set or a personal computer. The DHCT 200 preferably includes a communications interface 242 for receiving signals (video, audio and/or other data) from the headend 110 through the network 130 (FIG. 1) and for providing any reverse information to the headend 110.

DHCT 200 is referred to as a receiver such as receiver 200 throughout this specification. The DHCT 200 further preferably includes at least one processor 244 for controlling operations of the DHCT 200, an output system 248 for driving the television display 140, and a tuner system 245 for tuning to a particular television channel or frequency and for sending and receiving various types of data to/from the headend 110. The DHCT 200 may, in another embodiment, include multiple tuners for receiving downloaded (or transmitted) data. Tuner system 245 can select from a plurality of transmission signals provided by the subscriber television system 100, including a 1080P-60 program. Tuner system 245 enables the DHCT 200 to tune to downstream media and data transmissions, thereby allowing a user to receive digital media content such as a 1080P-60 program via the subscriber television system. The tuner system 245 includes, in one implementation, an out-of-band tuner for bi-directional quadrature phase shift keying (QPSK) data communication and a quadrature amplitude modulation (QAM) tuner (in band) for receiving television signals. Additionally, a user command interface 246 receives externally-generated user inputs or commands from an input device such as, for example, a remote control. User inputs could be alternatively received via communication port 274.

The DHCT 200 may include one or more wireless or wired interfaces, also called communication ports 274, for receiving and/or transmitting data to other devices. For instance, the DHCT 200 may feature USB (Universal Serial Bus), Ethernet, IEEE-1394, serial, and/or parallel ports, etc. DHCT 200 may also include an analog video input port for receiving analog video signals. User input may be provided via an input device such as, for example, a hand-held remote control device or a keyboard.

The DHCT 200 includes signal processing system 214, which comprises a demodulating system 213 and a transport demultiplexing and parsing system 215 (herein demultiplexing system) for processing broadcast media content and/or data. One or more of the components of the signal processing system 214 can be implemented with software, a combination of software and hardware, or preferably in hardware. Demodulating system 213 comprises functionality for demodulating analog or digital transmission signals. For instance, demodulating system 213 can demodulate a digital transmission signal in a carrier frequency that was modulated, among others, as a QAM-modulated signal. When tuned to a carrier frequency corresponding to an analog TV signal, demultiplexing system 215 is bypassed and the demodulated analog TV signal that is output by demodulating system 213 is instead routed to analog video decoder 216. Analog video decoder 216 converts the analog TV signal into a sequence of digitized pictures and their respective digitized audio. The analog TV decoder 216 and other analog video signal components may not exist in receivers or DHCTs that do not process analog video or TV channels.

A compression engine in the headend processes a sequence of 1080P-60 pictures and associated digitized audio and converts them into compressed video and audio streams, respectively. The compressed video and audio streams are produced in accordance with the syntax and semantics of a designated audio and video coding method, such as, for example, MPEG-2, so that they can be interpreted by video decoder 223 and audio decoder 225 for decompression and reconstruction after transmission of the two video streams corresponding to the 1080P-60 compressed signal. Each compressed stream consists of a sequence of data packets containing a header and a payload. Each header contains a unique packet identification code, or packet_identifier (PID) as is the casein MPEG-2 Transport specification, associated with the respective compressed stream. The compression engine or a multiplexer at the headend multiplexes the first and second video streams into a transport stream, such as an MPEG-2 transport stream.

Video decoder 223 may be capable of decoding a first compressed video stream encoded according to a first video specification and a second compressed video stream encoded according to a second video specification that is different than the first video specification. Video decoder 223 may comprise of two different video decoders, each respectively designated to decode a compressed video stream according to the respective video specification.

Parsing capabilities 215 within signal processing 214 allow for interpretation of sequence and picture headers. The packetized compressed streams can be output by signal processing 214 and presented as input to media engine 222 for decompression by video decoder 223 and audio decoder 225 for subsequent output to the display device 140 (FIG. 1).

Demultiplexing system 215 can include MPEG-2 transport demultiplexing. When tuned to carrier frequencies carrying a digital transmission signal, demultiplexing system 215 enables the separation of packets of data, corresponding to the desired video streams, for further processing. Concurrently, demultiplexing system 215 precludes further processing of packets in the multiplexed transport stream that are irrelevant or not desired such as, for example in a 1080i-60 capable receiver, packets of data corresponding to the second video stream of the 1080P-60 program.

The components of signal processing system 214 are preferably capable of QAM demodulation, forward error correction, demultiplexing MPEG-2 transport streams, and parsing packetized elementary streams and elementary streams. The signal processing system 214 further communicates with processor 244 via interrupt and messaging capabilities of DHCT 200.

The components of signal processing system 214 are further capable of performing PID filtering to reject packetized data associated with programs or services that are not requested by a user or unauthorized to DHCT 200, such rejection being performed according to the PID value of the packetized streams. PID filtering is performed according to values for the filters under the control of processor 244. PID filtering allows for one or more desired and authorized programs and/or services to penetrate into DHCT 200 for processing and presentation. PID filtering is further effected to allow one or more desired packetized streams corresponding to a program (e.g., a 1080P_60 program) to penetrate DHCT 200 for processing, while simultaneously rejecting one or more different packetized stream also corresponding to the same program. Processor 244 determines values for one or more PIDS to allow to penetrate, or to reject, from received information such as tables carrying PID values as described later in this specification. In an alternate embodiment, undesirable video streams of a program are allowed to penetrate into DHCT 200 but disregarded by video decoder 223.

A compressed video stream corresponding to a tuned carrier frequency carrying a digital transmission signal can be output as a transport stream by signal processing 214 and presented as input for storage in storage device 273 via interface 275. The packetized compressed streams can be also output by signal processing system 214 and presented as input to media engine 222 for decompression by the video decoder 223 and audio decoder 225.

One having ordinary skill in the art will appreciate that signal processing system 214 may include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention. For example, analog signals (e.g., NTSC) may bypass one or more elements of the signal processing system 214 and may be forwarded directly to the output system 248. Outputs presented at corresponding next-stage inputs for the aforementioned signal processing flow may be connected via accessible memory 252 in which an outputting device stores the output data and from which an inputting device retrieves it. Outputting and inputting devices may include analog video decoder 216, media engine 222, signal processing system 214, and components or sub-components thereof. It will be understood by those having ordinary skill in the art that components of signal processing system 214 can be spatially located in different areas of the DHCT 200.

In one embodiment of the invention, a first and second tuners and respective first and second demodulating systems 213, demultiplexing systems 215, and signal processing systems 214 may simultaneously receive and process the first and second video streams of a 1080P-60 program, respectively. Alternatively, a single demodulating system 213, a single demultiplexing system 215, and a single signal processing system 214, each with sufficient processing capabilities may be used to process the first and second video streams in a 1080P-60 capable receiver.

The DHCT 200 may include at least one storage device 273 for storing video streams received by the DHCT 200. A PVR application 277, in cooperation with the operating system 253 and the device driver 211, effects, among other functions, read and/or write operations to the storage device 273. The device driver 211 is a software module preferably resident in the operating system 253. The device driver 211, under management of the operating system 253, communicates with the storage device controller 279 to provide the operating instructions for the storage device 273. Storage device 273 could be internal to DHCT 200, coupled to a common bus 205 through a communication interface 275.

Received first and second video streams are deposited transferred to DRAM 252, and then processed for playback according to mechanisms that would be understood by those having ordinary skill in the art. In some embodiments, the video streams are retrieved and routed from the hard disk 201 to the digital video decoder 223 and digital audio decoder 225 simultaneously, and then further processed for subsequent presentation via the display device 140.

Compressed pictures in the second video stream may be compressed independent of reconstructed pictures in the first video stream. On the other hand, an aspect of the invention is that pictures in the second video stream, although compressed according to a second video specification that is different to the first video specification, can depend on decompressed and reconstructed pictures in the first video stream for their own decompression and reconstruction.

Examples of dependent pictures are predicted pictures that reference at most one picture (from a set of at least one reconstructed picture) for each of its sub-blocks or macroblocks to effect its own reconstruction. That is, predicted pictures in the second video stream, can possibly depend one or more referenced pictures in the first video stream.

Bi-predicted pictures (B-pictures) can reference at most two pictures from a set of reconstructed pictures for reconstruction of each of its sub-blocks or macroblocks to effect their own reconstruction.

In one embodiment, pictures in the second video stream reference decompressed and reconstructed pictures (i.e., reference pictures) from the first video stream. In another embodiment, pictures in the second video stream employ reference pictures from both the first and second video streams. In yet another embodiment, a first type of picture in the second video stream references decompressed pictures from the second video stream and a second type of picture references decompressed pictures from the first video stream.

Enabling Receivers with Different Capabilities

The present invention includes several methods based on two separate video streams assigned to a program rather than a single stream with inherent built-in temporal scalability. Existing receivers capable of processing 1080i-60 video streams today would be deemed "legacy HD receivers" at the time that broadcasters start emissions of 1080P-60 programs. If a 1080P-60 program was transmitted without the advantage of this invention the "then" legacy HD receivers would not know how to process a 1080P-60 video stream, nor be capable of parsing the video stream to extract a 1080P-30 signal from the received 1080P-60. The legacy HD receivers were not designed to identify and discard pictures from a single 1080P-60 video stream. Furthermore, 1080P-60 in the standard bodies is specified for a 1080P-60 receiver without backward compatibility to 1080i-60 receivers.

This invention enables 1080i-60 receivers to process the portion of the 1080P-60 program corresponding to a first video stream and reject a complementary second video stream based on PID filtering. Thus, by processing the first video stream, a 1080i-60 receiver provides a portion of the 1080P-60 program that is equivalent to 1080P-30. The invention is equally applicable, for example, to 1080P-50, assigning two separate video streams to a program. Future 1080P50-capable receivers process the 1080P-50 video from the two separate video streams according to the invention, while legacy 1080i-50-capable receivers process a 1080P-25 portion of the 1080P-50 video program.

Hereinafter, 1080P-60 is used for simplicity to refer to a picture sequence with twice the picture rate of a progressive 1080P-30 picture sequence, or to a picture sequence with twice the amount of picture elements as an interlaced picture sequence displayed as fields rather than full frames. However, it should be understood that the invention is applicable to any pair of video formats with the same picture spatial resolution, in which a first video format has twice the "picture rate" of the second. The invention is also applicable to any pair of video formats with the same picture spatial resolution, in which a first video format has "progressive picture rate" and the second has an "interlaced" or field picture rate, the first video format resulting in twice the number of processed or displayed pixels per second. The invention is further applicable to any two video formats in which the first video format's picture rate is an integer number times that of the second video format or in which the number of pixels of a first video format divided by the number of pixels of a second video format is an integer number.

Stream Types and Unique PIDs

The MPEG-2 Transport specification referred to in this invention is described in the two documents: ISO/IEC 13818-1:2000 (E), International Standard, Information technology—Generic coding of moving pictures and associated audio information: Systems, and ISO/IEC 13818-1/Amd. 3: 2003 Amendment 3: Transport of AVC video data over ITU-T Rec. H.222.0 |ISO/IEC 13818-1 streams.

In accordance with MPEG-2 Transport syntax, a multiplexed transport carries Program Specific Information (PSI) that includes the Program Association Table (PAT) and the Program Map Table (PMT). Information required to identify and extract a PMT from the multiplexed transport stream is transmitted in the PAT. The PAT carries the program number and packet_identifier (PID) corresponding to each of a plurality of programs, at least one such program's video being transmitted as encoded 1080P-60 video according to the invention.

Figure 3:
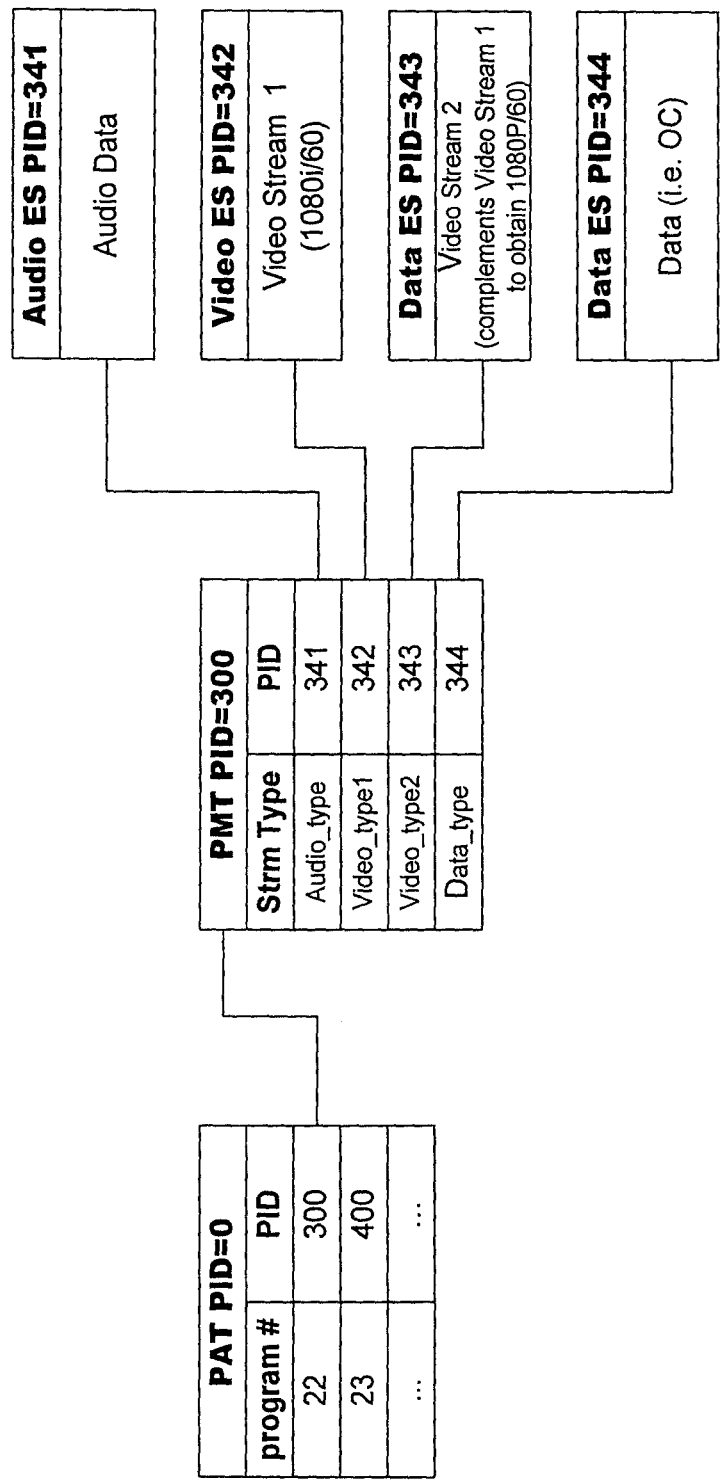
FIG. 3 illustrates program specific information (PSI) of a program having elementary streams including encoded video streams which may be combined to form a single video stream encoded as 1080P-60.

As shown in the FIG. 3, the PMT corresponding to a 1080P-60 program carries two video streams, each uniquely identified by a corresponding PID. The first video stream in the PMT has a unique corresponding PID 342 and the second video stream has its unique corresponding PID 343, for example. Likewise, the first and second video streams of the 1080P-60 program have corresponding stream type values. A stream type is typically a byte. The stream type value for the first and second video streams are video_type1 and video_type2, respectively.

In one embodiment, the stream type value, video_type1 equals video_type2, therefore, both video streams are encoded according to the syntax and semantics of the same video specification (e.g., both as MPEG-2 video or as MPEG-4 AVC). A receiver is then able to identify and differentiate between the first video stream and the second video stream by their PID values and the relationship of the two PID values. For example, the lower PID value of video_type1 would be associated with the first video stream. However, legacy HD receivers would not be able to incorporate such a processing step as a feature. However, there may be two types of legacy receivers. During a first era, legacy receivers may be HD receivers that are capable of processing a first video stream encoded according to the MPEG-2 video specification described in ISO/IEC 13818-2:2000 (E), International Standard, Information technology—Generic coding of moving pictures and associated audio information: Video. The second video stream would likely be encoded with a video specification that provides superior compression performance, for example, MPEG-4 AVC as described by the three documents: ISO/IEC 14496-10 (ITU-T H.264), International Standard (2003), Advanced video coding for generic audiovisual services; ISO/IEC 14496-10/Cor. 1: 2004 Technical Corrigendum 1; and ISO/IEC 14496-10/Amd. 1, 2004, Advanced Video Coding AMENDMENT 1: AVC fidelity range extensions. A second era, on the other hand, may comprise legacy HD receivers that are capable of processing 1080i-60 video encoded according to the MPEG-4 AVC specification. Because the latter legacy receivers have yet to be deployed, these receivers could be designed to support identification of the first video stream in a multiple video stream program from the lowest PID value corresponding to video_type1 in the PMT. Alternatively, the first video entry in the PMT table, regardless of its PID value, would be considered the first video stream.

In another alternate embodiment, the streams are encoded according to different video specifications and the values of video_type1 and video_type2 in the PMT differ. For example, the first video stream would be encoded and identified as MPEG-2 video in the PMT by a video_type1 value that corresponds to MPEG-2 video. The second video stream would be encoded with MPEG-4 AVC and identified by a video_type2 value corresponding to MPEG-4 AVC.

In yet another alternate embodiment, video_type2 corresponds to a stream type specifically designated to specify the complementary video stream (i.e, the second video stream of a 1080P-60 program). Both video streams could be encoded according to the syntax and semantics of the same video specification (e.g, with MPEG-4 AVC) or with different video specifications. Thus, while the values of video_type1 and video_type2 are different in the PMT table for a 1080P-60 program, both video streams composing the 1080P-60 program could adhere to the same video specification. Thus, video_type1's value identifies the video specification used to encode the first video stream, but video_type2's value identifies both:

(1) the video stream that corresponds to the second video stream of the 1080P-60 program, and
(2) the video specification (or video coding format) used to encode the second video stream.

A first video_type2 value then corresponds to a stream type associated with the second stream of a 1080P-60 program that is encoded according to the MPEG-2 video specification. A second video_type2 value corresponds to a stream type associated with the second stream of a 1080P-60 program that is encoded according to the MPEG-4 AVC specification. Likewise, other video_type2 values can correspond to respective stream types, each associated with the second stream of a 1080P-60 program and encoded according to a respective video coding specification.

In yet another novel aspect of the invention, when video_type2 does not equal video_type1 and their values signify different video specifications, pictures in the second stream can still use reconstructed pictures from the first video stream as reference pictures.

Transmission Order of Pictures

Encoded pictures in the first and second video streams are multiplexed in the transport multiplex according to a defined sequence that allows a single video decoder in a 1080P-60 receiver to receive and decode the pictures sequentially as if the pictures were transmitted in a single video stream. However, because they are two separate video streams, a 1080i-60 receiver can reject transport packets belonging to the second video stream and allow video packets corresponding to the first video stream to penetrate into its memory to process a portion equal to 1080P-30 video. Encoded pictures in the first video stream are transmitted in transmission order, adhering to the timing requirement and bit-buffer management policies required for a decoder to process the first video stream as a 1080P-30 encoded video signal.

In one embodiment of the invention, FIG. 4A depicts the first and second video streams in display order. P represents a picture and not a type of picture. Pi is the ith picture in display order. In a 1080P-60 receiver, the blank squares represent gaps of when the picture being displayed is from the complementary video stream. The width of a blank square is one "picture display" time. Non-blank squares represent the time interval in which the corresponding picture is being displayed.

Still referring to FIG. 4A, in a 1080i-60 receiver, a 1080P-30 picture corresponding to the first video stream is displayed and the width of two squares represents the picture display time. Video stream 1 is specified as 30 Hertz in alternating 60 Hertz intervals that correspond to even integers. Video stream 2 is specified as 30 Hertz in alternating 60 Hertz intervals that correspond to odd integers.

FIG. 4B depicts pictures according to picture types in display order. Ni signifies the ith Picture in display order, where N is the type of picture designated by the letter I, P or B. In one embodiment, all the pictures in video stream 2 are B pictures and the 1080P-60 receiver uses decoded pictures from video stream 1 as reference pictures to reconstruct the B pictures.

FIG. 4C corresponds to the transmission order of the pictures in display order in FIG. 4B. Each picture is transmitted (and thus received by the receiver) at least one 60 Hz interval prior to its designated display time. I pictures are displayed six 60 Hz interval after being received and decoded. I pictures are thus transmitted at least seven 60 Hz intervals prior to its corresponding display time. The arrows from FIG. 4C to FIG. 4B reflect the relationship of the pictures' transmission order to their display order.

Blank squares in FIG. 4C represent gaps when no picture data is transmitted for the respective video stream. The width of a blank square can be approximately one "picture display" time. Non-blank squares represent the time interval in which the corresponding picture is transmitted. One or more smaller transmission gaps of no data transmission may exist within the time interval in which a picture is transmitted. In essence, video stream 1 and video stream 2 are multiplexed at the emission point in a way to effect the transmission order reflected in FIG. 4C and transmission time relationship depicted in FIG. 4C.

Bit-Buffer Management

A sequence of video pictures is presented at an encoder for compression and production of a compressed 1080P-60 program. Every other picture is referred as an N picture and every subsequent picture as an N+1 picture. The sequence of all the N pictures is the first video stream of the 1080P-60 program and the sequence all the N+1 pictures is the second video stream.

A video encoder produces the first video stream according to a first video specification (e.g., MPEG-2 video) and the second video stream according to a second video specification (e.g., MPEG-4 AVC). In one embodiment the second video specification is different than the first video specification. In an alternate embodiment, the first and second video specifications are the same (e.g., MPEG-4 AVC).

The video encoder produces compressed pictures for the first video stream by depositing the compressed pictures into a first bit-buffer in memory, such memory being coupled to the encoder. Depositing of compressed pictures into the first bit-buffer is according to the buffer management policy (or policies) of the first video specification. The first bit-buffer is read for transmission by the video encoder in one embodiment. In an alternate embodiment, a multiplexer or transmitter reads the compressed pictures out of the first bit-buffer. The read portions of the first bit buffer are packetized and transmitted according to a transport stream specifications such as MPEG-2 transport.

Furthermore, the video encoder, the multiplexer, or the transmitter, or the entity performing the first bit-buffer reading and packetization of the compressed pictures, prepends a first PID to packets belonging to the first video stream. The packetized first video stream is then transmitted via a first transmission channel.

Similarly, the second video stream is produced by the video encoder and deposited into the first bit buffer. The second video stream is read from the first bit-buffer by the entity performing the packetization, and the entity prepends a second PID to packets belonging to the second video stream, and the transport packets are transmitted via a first transmission channel.

In an alternate embodiment, the second video stream is produced by the video encoder and deposited into a second bit buffer. The entity performing the packetization reads the second video stream from the second bit buffer and prepends the second PID to packets belonging to the second video stream. The packetized second video stream is then transmitted via a first transmission channel.

Both first and second video streams are packetized according to a transport stream specification, such as MPEG-2 Transport. Packets belonging to the second video stream are thus identifiable by a 1080P-60 capable receiver and become capable of being rejected by a receiver that is not capable of processing 1080P-60 programs.

The bit buffer management policies of depositing compressed picture data into the first and/or second bit-buffers and reading (or drawing) compressed-picture data from the first and/or second bit-buffers, are according to the first video specification. These operations may be further in accordance with bit-buffer management policies of the transport stream specification. Furthermore, the bit-buffer management policies implemented on the one or two bit-buffers may be according to the second video specification rather than the first video specification. In one embodiment, the first video stream's compressed data in the bit-buffer is managed according to both: the bit buffer management policies of the first video specification and the transport stream specification, while the second video stream's compressed data in the applicable bit-buffer is managed according to the bit buffer management policies of the second video specification as well as the transport stream specification.

The bit-buffer management policies described above are applicable at the emission or transmission point in the network, such as by the encoder and the entity producing the multiplexing and/or transmission. Bit-buffer management policies, consistent with the actual implementation at the emission or transmission point, are applicable at the receiver to process the one or more received video streams of a 1080P-60 program. The bit-buffer management policy implemented at the emission or transmission point may be provided to the receiver a priori for each program (e.g., with metadata) or according to an agreed one of the alternatives described above that is employed indefinitely.

Enabling More than Two Receivers with Different Respective Processing Capabilities In an alternate embodiment, the video encoder constitutes two video encoders, a first video encoder producing the first video stream according to the first video specification, and a second video encoder producing the second video stream, which is interspersed for transmission in the transmission channel according to the pockets of "no data" transmission of video stream 1 (as shown in FIG. 4C). The second video encoder further producing the second video stream according to the second video specification.

In yet another embodiment, the process of alternating transmission of compressed pictures corresponding to the first video stream and compressed pictures corresponding to the second video stream, results in transmission of a first set of consecutive compressed pictures from different the first video stream when it is the turn to transmit the first video stream, or a second set of consecutive compressed pictures from different the second video stream when it is the turn to transmit the second video stream. For instance, instead of alternating between one compressed picture from the first video stream and one from the second video stream, two consecutive compressed pictures from the second video stream may be transmitted after each transmission of a single compressed picture of the first video stream. Thus, a 1080P-90 Hertz program can be facilitated to 1080P-90 receivers and a 1080P-30 portion of the 1080P-90 program to 1080P-30 receivers. Furthermore, by packetizing every second compressed picture in the second video stream with a third PID value that is different than the first and second PIDs, three corresponding versions of the compressed 1080P-90 program are facilitated respectively to a 1080P-30 receiver, a 1080P-60 receiver, and a 1080P-90 receiver, the latter being able to receive and fulfill the full benefits of the 1080P-90 program.

In yet another embodiment, the number of consecutive compressed pictures that is transmitted from the first video stream may be greater than one. For instance, if two consecutive compressed pictures from the first video stream are transmitted and three compressed pictures from the second video stream are transmitted after transmission the two from the first video stream, a number of receivers with different processing capabilities may be enabled. If two different PID values are employed, a 1080P-50 receiver will receive a 1080P-50 Program and a 1080P-20 receiver will receive a 1080P-20 corresponding portion. However, if five different PID values are used for the 1080P-50 program, five receivers, each with different processing capability will be capable of receiving a portion of the 1080P-50 program.

Third Video Specification

Headend 110 may receive from an interface to a different environment, such as from a satellite or a storage device, an already compressed 1080P-60 program—a single video stream encoded according to a third video specification and according to a first stream specification. The first stream specification may be a type of transport stream specification suitable for transmission or a type of program stream specification suitable for storage. The third video specification may comprise of the first video specification, the second video specification, or both the first and second video specifications respectively applied, for example, to every other compressed picture. However, the already compressed 1080P-60 program is received at headend 110 encoded in such a way that it does not facilitate reception some of its portions by receivers with processing capability that are less than those of a 1080P-60 receiver. In other words, it is received without information to inherent signal its different portions to receivers with different processing capabilities.

Another novel aspect of this invention is that at least one from one or more encoders, one or more multiplexers, or one or more processing entities at the point of transmission at headend 110, effect packetization of the compressed pictures of the received 1080P-60 program with a plurality of different PIDS, then transmitting the 1080P-60 program as a plurality of identifiable video streams via the first transmission channel. Thus, headend 110 effects proper packetization and prepending of PID values to enable reception of at least a portion of the 1080P-program to receivers with different processing capabilities that are coupled to network 130.

The present invention includes methods and systems capable of transmitting compressed video signals according to one or more compression video formats, where compressed video signals correspond to television channels or television programs in any of a plurality of picture formats (i.e., picture spatial resolution and picture rate), including 1080i-60 and 1080P-60 formats. The compressed video signals which correspond to television channels or television programs in any of a plurality of picture formats are received by a plurality of receivers, where each receiver may have a different maximum processing capability. Therefore, the present invention contemplates at least the following combinations for encoding, transmission and reception of video signals. In the following combinations of trio "input/receiver/display," the input, such as 1080P-60 input in the first combination instance, refers to a compressed video stream that is received at receiver 200 from network 130 via communication interface 242. The display, such as the 1080P-60 Display in the first combination instance is a television, a display, or a monitor coupled to DHCT 200 via output system 248. The DHCT 200 provides the compressed video stream corresponding to the "input" in "decoded and reconstructed" form (visible pictures) via output system 248. The receiver, such as 1080P-60 Receiver in the first combination instance, refers to a receiver, such as DHCT 200, that has the processing capability specified in the trio.

1080P-60 Input/1080P-60 Receiver/1080P-60 Display

In order to process a 1080P-60 compressed video signal, a 1080P-60 capable receiver receives a compressed 1080P-60 video stream via a network interface (or a communication interface). The 1080P-60 compressed video signal is input by storing it in its memory and the receiver decodes with a video decoder (or decompression engine) all the pictures corresponding to the 1080P-60 video signal (or compressed video stream). A 1080P-60 capable display is driven by all the decoded 1080P-60 pictures.

1080i-60 Input/1080P-60 Receiver/1080P-60 Display

In order to process a 1080i-60 compressed video signal, the 1080P-60 capable receiver receives a compressed 1080i-60 video stream via a network interface (or a communication interface). The 1080P-60 compressed video signal is input by storing it in its memory and the receiver decodes with a video decoder (or decompression engine) all the pictures corresponding to the compressed 1080i-60 video signal stored in memory. The 1080P-60 receiver then deinterlaces the decoded 1080i-60 signal with a deinterlacing algorithm based on information in two or more 1080i fields, including a current 1080i field. The deinterlacing algorithm makes decisions based on spatial picture information as well as temporal information. The deinterlacing algorithm can further base decisions on motion estimation or motion detection. A 1080P-60 capable display is driven by all the decoded 1080P-60 pictures.

1080P-60 Input/1080P-60 Receiver/Non-1080P-60 Display

In order to process a 1080P-60 compressed video signal, the 1080P-60 capable receiver receives a compressed 1080P-60 video stream via a network interface (or a communication interface). When driving a non-1080P-60 display, the receiver outputs a portion of all the decoded 1080P-60 pictures or processes and scales the pictures of the decoded 1080P-60 signal for display. When driving a non-1080P-60 display such as a 1080i-60 display, the 1080P-60 capable receiver could process a 1080P-60 compressed video signal in full (as explained above) and output (or display) a portion of each of the decoded 1080P-60 pictures. The portion may be a temporally-subsampled portion, a spatially-subsampled portion, or a portion resulting from a combination of a temporal-subsampling and spatially-subsampling. Alternatively, when driving a non-1080P-60 capable display, the 1080P60-capable receiver is informed by the user or through a discovery mechanism that the display is not 1080P-60. Consequently, the 1080P-60-capable receiver can behave as if it was a 1080P-30 receiver by not processing the second video stream.

1080i-60 Input/1080P-60 Receiver/Non-1080P-60 Display

When driving a non-1080P-60 display, a 1080P-60 receiver processes a 1080i-60 compressed video signal and outputs the decoded 1080i-60 pictures according to the picture format required to drive the non-1080 display, processing and scaling the pictures of the decoded 1080i-60 signal as required to drive the non-1080P-60 display.

1080P-60 Input/1080i-60 Receiver/Non-1080P-60 Display

In order to process a 1080P-60 compressed video signal, a 1080i-60 capable receiver receives a compressed 1080P-60 video stream via a network interface (or a communication interface). The receiver inputs a first portion of the 1080P-60 compressed video signal by storing it in memory of receiver 200 and the receiver rejects a second and complementary portion of the 1080P compressed video signal by prohibiting it from penetrating any section, portion or buffer of its memory. The receiver 200 decodes with a video decoder (or decompression engine) all the pictures corresponding to the first portion of the 1080P-60 video signal; processing it as if it were a 1080i-60 compressed video signal. A 1080i-60 capable display is driven by the decoded first portion of the 1080P-60 pictures.

1080P-60 Input/1080i-60 Receiver/1080P-60 Display—A

In order to process a 1080P-60 compressed video signal, a 1080i-60 capable receiver receives a compressed 1080P-60 video stream via a network interface (or a communication interface). The receiver inputs a first portion of the 1080P-60 compressed video signal corresponding to a 1080i-60 compressed video signal by storing it in its memory and rejects a second and complementary portion of the 1080P compressed video signal by prohibiting it from penetrating any section, portion or buffer of its memory. The receiver decodes with a video decoder (or decompression engine) all the pictures corresponding to the first portion of the 1080P-60 video signal, processing it as if it were a 1080i-60 compressed video signal. The receiver deinterlaces a decoded 1080i-60 signal with a deinterlacing algorithm based on information in two or more 1080i fields, including a current 1080i field. The deinterlacing algorithm makes decisions based on spatial picture information as well as temporal information. The deinterlacing algorithm can further base decisions on motion estimation or motion detection. A 1080P-60 capable display is driven by all the decoded and deinterlaced 1080i-60 pictures as a 1080P-60 signal.

1080P-60 Input/1080i-60 Receiver/1080P-60 Display—B

In order to process a 1080P-60 compressed video signal, a 1080i-60 capable receiver receives a compressed 1080P-60 video stream via a network interface (or a communication interface). The receiver inputs a first portion of the 1080P-60 compressed video signal corresponding to a 1080i-60 compressed video signal by storing it in its memory and rejects a second and complementary portion of the 1080P-60 compressed video signal by prohibiting it from penetrating any section, portion or buffer of its memory. The receiver decodes with a video decoder (or decompression engine) all the pictures corresponding to the first portion of the 1080P-60 video signal, processing it as if it were a 1080i-60 compressed video signal. In order to drive a 1080P-60 capable display that is capable of receiving a 1080i-60 signal and internal deinterlacing, the display is driven by all the pictures of the decoded 1080i-60 compressed video signal as a 1080i-60 signal. The 1080P-60 display deinterlaces the received 1080i-60 signals according to its deinterlacing capabilities.

Encoding and Transmission

The encoder produces a 1080P-60 encoded video stream according to a video specification (i.e., MPEG-2 video or MPEG-4 AVC), and assigns a first PID value to packets of every other encoded picture corresponding to the 1080P-60, and assigns a second PID value to every packet of the subsequent picture to the "every other" picture just mentioned, where the second PID value is different from the first PID value. Denoting "every other picture" by N, every subsequent picture is then N+1; and the first PID_value is used for N, while the second PID_value is used for N+1.

The encoder in one embodiment encodes all pictures according to a single video format, e.g., MPEG-4 AVC, and adheres to the buffer model of the video specification. The encoder in a second embodiment encodes the pictures that correspond to N according to a first video specification and in compliance with the video specification's buffering model, and according to a variable-bit rate model. The encoder further encodes the alternate pictures, every "N+1" picture, according to a second video specification, the second video specification being different from the first video specification. These alternate pictures are encoded according to the syntax of the second video specification, but managed and transferred into a transmission buffer according to the first video specification's buffering model. The encoder further employs in its "encoding loop" a model, or parts thereof, of a receiver's video decoder, including reference pictures, in it's memory.

Encode 1080P at 60 frames per second, into a single output, ensuring that every other picture (in both decode order and presentation order) is a non-reference picture. Every picture encoded is a progressive frame representing $\frac{1}{60}^{th}$ seconds. Now, every other picture can be separated into a new PID. This new PID may be called "PID B", and the other PID may be called "PID A". PID B contains only non-reference pictures that can optionally be included in the decoding of PID A. In this separation process, the original picture ordering must be maintained within the multiplex. For example, a picture in one PID must end before the next picture begins in the other PID.

For backwards-compatibility, the frame rate value in PID A should be set at 30 frames per second; and the temporal references in PID A should be corrected for the separated pictures; and as a convenience, the temporal references in PID B should be set to match those in PID A, such that each picture pair shares a temporal reference number. The 1080P-60 capable decoder will be aware that the frame rate is actually 60 frames per second, and will support the pairs of duplicate temporal references. When decoding both PID A and PID B in combination, the decoder should expect two of every temporal reference number, adjacent in presentation order. Therefore, for example, it can use the temporal reference numbers to detect a missing picture. Picture re-ordering within the decoder may be based on the sequence of picture types received, as normal.

The following are examples of this scheme demonstrating how a decoder could receive PID A alone, or receive the combination of PID A and PID B. In these examples, the "B"-type pictures represent non-reference frames. Also, these examples are given in decode order, and the numbers represent temporal references (indicating presentation order).

EXAMPLE 1

IBBBP . . . :
Before temporal reference number (TRN) correction:
PID A: I3_B1_P7_B5_P11_B9_P15_B13_
PID B: _B0_B2_B4_B6_B8_B10_B12_B14
After TRN correction:
PID A: I1_B0_P3_B2_P5_B4_P7_B6_
PID B: _B0_B1_B2_B3_B4_B5_B6_B7

EXAMPLE 2

IBP . . . :
Before TRN correction:
PID A: I1_P3_P5_P7_P9_P11_P13_P15_
PID B: _B0_B2_B4_B6_B8_B10_B12_B14
After TRN correction:
PID A: I0_P1_P2_P3_P4_P5_P6_P7_
PID B: _B0_B1_B2_B3_B4_B5_B6_B7
In the PMT, PID B can be designated by a new stream_type. A common set of audio streams may serve each case: 1) using only PID A 2) using both PID A and PID B.

In the above described method of encoding and transmission, the separation of every other frame occurred after encoding. In an alternative embodiment, separation occurs prior to encoding. At one encoder's input, supply every other frame of a 1080P-60 hz signal. Encode this as 1080P-30 hz. Simultaneously, supply another encoding process with the alternate frames, also at 1080P-30 hz. Presentation time stamps (PTSs) shall be generated for every picture, referencing a common clock. The result is two video streams, each being legitimate 1080P-30 hz. A 1080P-60 capable decoder may decode both simultaneously, as a dual-decode operation, to be recombined in the display process. There need be no further correlation between the two PIDs than the commonly referenced PTSs. For example, the group of pictures (GOP) structures, as defined by the video specification (e.g., MPEG-2 video GOP) may be independent, and the buffering may be independent. To recombine the dual 1080P-30 streams into a single 1080P-60 output, the dual-decoder's display process will choose decoded pictures to put on display in order of PTS. If the picture for a particular time interval has not yet been decoded, possibly due to some data corruption or loss, then the previous picture will simply be repeated through that time interval. If any picture is decoded later than its PTS elapses, it is to be discarded. Even though both PIDs may be completely independent, because they reference the same clock, there is no risk that a picture from one PID is sent later than the presentation time of a following picture from the other PID, as long as each PID's buffer is maintained compliantly within the multiplex.

PID B in the PMT may be designated by a new stream_type, which may be allocated by MPEG, or which may be a user-private stream_type that indicates a privately managed stream. The new stream_type would not be recognized by legacy receivers, so the associated PID B would be ignored. As an additional method of unambiguous identification of the special second PID, the registration_descriptor may be used in the ES_descriptor_loop of the PMT to register a unique and private attribute for association with PID B. Any combination of the above methods may be used, as deemed adequate and sensible. A common set of audio streams may serve each case: 1) using only PID A 2) using both PID A and PID B. The methods described above use a separate PID to carry additional information. In those cases, the separate PID can optionally be ignored by the decoder. In another alternative embodiment, a single video PID may be used to carry both the base information and the additional information, while still providing a way to optionally reject the additional information. A separate packetized elementary stream (PES) ID can be used such that a new PMT descriptor, which would be allocated by MPEG, may designate one PES ID for the base layer, and a different PES ID for the additional information, both carried by the same PID. In this way, existing PES IDs may be identified as base, and supplemental, without the need for new PES IDs to be allocated. The decoder that needs only the base layer may discard those PES packets whose ID does not match the ID designated as the base layer in the PMT. The decoder that can use both may simply not reject either. This approach is applicable to both schemes: post-encoding-separation and prior-encoding-separation.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method, comprising:
    receiving and processing by a receiver, for a first period of time, a first program, the first program corresponding to a first multiplexed plurality of streams (FMPOS), the FMPOS including a video stream coded according to a first video stream specification, wherein the FMPOS includes only one video stream corresponding to a first video type value;
    receiving by the receiver, during a second period of time, a second program, the second program corresponding to a second multiplexed plurality of streams (SMPOS), wherein receiving the second program comprises receiving program specific information (PSI) comprising a program association table (PAT) and a program map table (PMT), wherein the PAT comprises a list of programs in a transport stream and an associated packet identifier (PID) for a corresponding mapping table (PMT) for each of the programs on the list, wherein the PAT further comprises an unique PID identifying the PMT for the second program, wherein the PMT for the second program comprises a list of streams associated with the second program by a stream type value and a corresponding PID for each of the streams, wherein the list of streams comprises a first video stream coded according to the first video specification and having the first video type value and a second video stream coded according to a second video stream specification, the second video stream corresponding to a second video type value different than the first video type value, wherein the first video type value has a first unique associated first packet identifier (PID) and the second video type value has a second unique PID, and wherein the second video type value is a video type value which is not recognizable by the receiver; and
    processing, during the second period of time, the first video stream of the second program, and disregarding the second video stream.

2. The method of claim 1, further including a third period of time, the third period of time having a start time after the end of the first period of time, wherein a start time of the second period of time is after the end of the third period of time.

3. The method of claim 1, wherein a start time of the second period of time is after an end of the first period of time.

4. The method of claim 1, further including receiving and processing a third program during the second period of time, the third program corresponding to a third multiplexed plurality of streams (TMPOS), the TMPOS including a third video stream coded according to the first video specification, wherein the TMPOS includes only one video stream.

5. The method of claim 1, wherein receiving during the first period of time further comprises receiving the video stream according to an interlaced format at a defined frequency, and wherein receiving during the second period of time further comprises receiving the first and second video stream according to a progressive format at half the defined frequency.

6. The method of claim 5, further comprising deinterlacing decoded pictures corresponding to the received and processed video stream and providing the deinterlaced pictures to a display device.

7. The method of claim 1, further comprising receiving during the second period of time a fourth program, the fourth program including only one video stream.

8. The method of claim 1, wherein disregarding comprises precluding processing of packets corresponding to the second video stream.

9. The method of claim 8, wherein precluding includes precluding packets based on a packet identifier prior to processing at a decoder.

10. The method of claim 8, further comprising receiving information that indicates which packets to preclude from processing.

11. The method of claim 1, wherein disregarding is responsive to processing at a decoder.

12. The method of claim 1, further receiving during the second period of time further comprises receiving the first and second video streams as interspersed in a transport stream, wherein responsive to processing of the first video stream, repeating decoded pictures during corresponding to intervals corresponding to the disregarded pictures of the second video stream.

13. The method of claim 1, wherein the receiver is capable of processing only one video stream.

14. An apparatus, comprising:
a receiver, the receiver comprising:
memory; and
one or more processors configured to:
receive and process, for a first period of time, a first program, the first program corresponding to a first multiplexed plurality of streams (FMPOS), the FMPOS including a video stream coded according to a first video specification, wherein the FMPOS includes only one video stream corresponding to a first video type value;
receive, during a second period of time, a second program, the second program corresponding to a second multiplexed plurality of streams (SMPOS), wherein receiving the second program comprises receiving program specific information (PSI) comprising a program association table (PAT) and a program map table (PMT), wherein the PAT comprises a list of programs in a transport stream and an associated packet identifier (PID) for a corresponding mapping table (PMT) for each of the programs on the list, wherein the PAT further comprises an unique PID identifying the PMT for the second program, wherein the PMT for the second program comprises a list of streams associated with the second program by a stream type value and a corresponding PID for each of the streams, wherein the list of streams comprises a first video stream coded according to the first video specification and having the first video type value and a second video stream coded according to a second video stream specification, the second video stream corresponding to a second video type value different than the first video type value, wherein the first video type value has a first unique associated first packet identifier (PID) and the second video type value has a second unique PID, wherein the second video type value is a video type value which is not recognizable by the receiver; and
process, during the second period of time, the first video stream, and disregarding the second video stream.

15. The apparatus of claim 14, further including a third period of time, the third period of time having a start time after the end of the first period of time, wherein a start time of the second period of time is after the end of the third period of time.

16. The apparatus of claim 14, wherein a start time of the second period of time is after an end of the first period of time.

17. The apparatus of claim 14, wherein the one or more processors are further configured to receive and process a third program during the second period of time, the third program corresponding to a third multiplexed plurality of streams (TMPOS), the TMPOS including a third video stream coded according to the first video specification, wherein the TMPOS includes only one video stream.

18. The apparatus of claim 14, wherein the one or more processors are further configured, during the first period of time, to receive the video stream according to an interlaced format at a defined frequency, and during the second period of time, receive the first and second video stream according to a progressive format at half the defined frequency.

19. The apparatus of claim 18, wherein the one or more processors are further configured to deinterlace decoded pictures corresponding to the received and processed video stream and provide the deinterlaced pictures to a display device.

20. The apparatus of claim 14, wherein the one or more processors are further configured to receive during the second period of time a fourth program, the fourth program including only one video stream.

* * * * *